United States Patent
Tsirkin et al.

(10) Patent No.: US 9,483,414 B2
(45) Date of Patent: Nov. 1, 2016

(54) ORDERED MEMORY PAGES TRANSMISSION IN VIRTUAL MACHINE LIVE MIGRATION

(71) Applicant: Red Hat Israel, Ltd., Raanana (IL)

(72) Inventors: Michael Tsirkin, Yokneam Yillit (IL); Karen Noel, Pembroke, NH (US)

(73) Assignee: Red Hat Israel, Ltd., Raanana (IL)

( * ) Notice: Subject to any disclaimer, the term of this patent is extended or adjusted under 35 U.S.C. 154(b) by 321 days.

(21) Appl. No.: 14/089,017

(22) Filed: Nov. 25, 2013

(65) Prior Publication Data

US 2015/0149687 A1 May 28, 2015

(51) Int. Cl.
*G06F 12/10* (2016.01)
*G06F 9/455* (2006.01)

(52) U.S. Cl.
CPC ......... *G06F 12/109* (2013.01); *G06F 9/45558* (2013.01); *G06F 2009/4557* (2013.01)

(58) Field of Classification Search
CPC .. G06F 12/109; G06F 9/455; G06F 9/45558; G06F 2009/4557
See application file for complete search history.

(56) References Cited

U.S. PATENT DOCUMENTS

| | | | | |
|---|---|---|---|---|
| 7,603,670 | B1* | 10/2009 | van Rietschote | G06F 9/4856 718/1 |
| 8,037,280 | B2 | 10/2011 | Pandey et al. | |
| 8,407,182 | B1* | 3/2013 | Rajaa | G06F 17/00 707/610 |
| 8,468,288 | B2 | 6/2013 | Corry et al. | |
| 8,527,990 | B1* | 9/2013 | Marathe | G06F 9/45558 718/1 |
| 2009/0063749 | A1* | 3/2009 | Dow | G06F 12/08 711/6 |
| 2011/0145471 | A1* | 6/2011 | Corry | G06F 9/4856 711/6 |
| 2011/0264788 | A1 | 10/2011 | Costa | |
| 2011/0265084 | A1* | 10/2011 | Knowles | G06F 9/461 718/1 |
| 2011/0302577 | A1* | 12/2011 | Reuther | G06F 9/45558 718/1 |
| 2011/0320556 | A1 | 12/2011 | Reuther | |
| 2012/0011254 | A1* | 1/2012 | Jamjoom | G06F 9/4856 709/226 |
| 2012/0011504 | A1 | 1/2012 | Ahmad et al. | |
| 2012/0159101 | A1 | 6/2012 | Miyoshi | |
| 2012/0192182 | A1* | 7/2012 | Hayward | G06F 9/455 718/1 |
| 2013/0024598 | A1 | 1/2013 | Serebrin et al. | |
| 2013/0086272 | A1 | 4/2013 | Chen et al. | |

FOREIGN PATENT DOCUMENTS

WO   2012063334   1/2012

OTHER PUBLICATIONS

Lai, Hsu-Fang et al., "Exploiting Neighborhood Similarity for Virtual Machine Migration over Wide-Area Network", Department of Computer Science, National Chiao Tung University, Taiwan, 10 Pages.

* cited by examiner

*Primary Examiner* — Hiep Nguyen
(74) *Attorney, Agent, or Firm* — Lowenstein Sandler LLP

(57) ABSTRACT

Systems and methods for virtual machine live migration. An example method may comprise: identifying, by a first computer system executing a virtual machine undergoing live migration to a second computer system, a plurality of stable memory pages comprised by an execution state of the virtual machine, wherein the plurality of stable memory pages comprises memory pages that have not been modified within a defined period of time; transmitting the plurality of stable memory pages to the second computer system; determining that an amount of memory comprised by a plurality of unstable memory pages is below a threshold value, wherein the plurality of unstable memory pages comprises memory pages that have been modified within the defined period of time; and transmitting the plurality of unstable memory pages to the second computer system.

20 Claims, 4 Drawing Sheets

ORDERED MEMORY PAGES TRANSMISSION IN VIRTUAL MACHINE LIVE MIGRATION

TECHNICAL FIELD

The present disclosure is generally related to virtualized computer systems, and is more specifically related to systems and methods for virtual machine live migration.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for ordered transmission of memory pages in virtual machine live migration. "Live migration" herein refers to the process of moving a running virtual machine from an origin host computer system to a destination host computer system without disrupting the guest operating system and/or the applications executed by the virtual machine. In certain implementations, a migration agent may copy the execution state of the virtual machine being migrated, including a plurality of memory pages, from the origin host to the destination host while the virtual machine is still running at the origin host. Upon completing the memory copying operation, the migration agent may re-copy the memory pages which have been modified, or became "dirty," during the memory copying operation. The migration agent may iteratively repeat the copying of dirty memory pages, until a pre-defined convergence condition has been met, e.g., until the memory pages "dirtying" rate becomes less than or equal to the virtual machine state transfer rate. When the convergence condition is met, the virtual machine may be stopped at the origin host, the dirty memory pages may be copied to the destination host, and the virtual machine may be restarted at the destination host.

The ratio of the total size of dirty memory pages which need to be retransmitted to the overall amount of the virtual machine memory can be indicative of the overall efficiency of the migration process. To reduce the number of the retransmitted memory pages, a migration agent may observe the virtual machine behavior and transmit the memory pages in a particular order, as described in more details herein below. In an illustrative example, the migration agent may cause stable memory pages (e.g., memory pages that have not been modified within a defined period of time) to be transmitted first, followed by the transmission of remaining memory pages.

Various aspects of the above referenced methods and systems are described in details herein below by way of examples, rather than by way of limitation.

Figure 1:
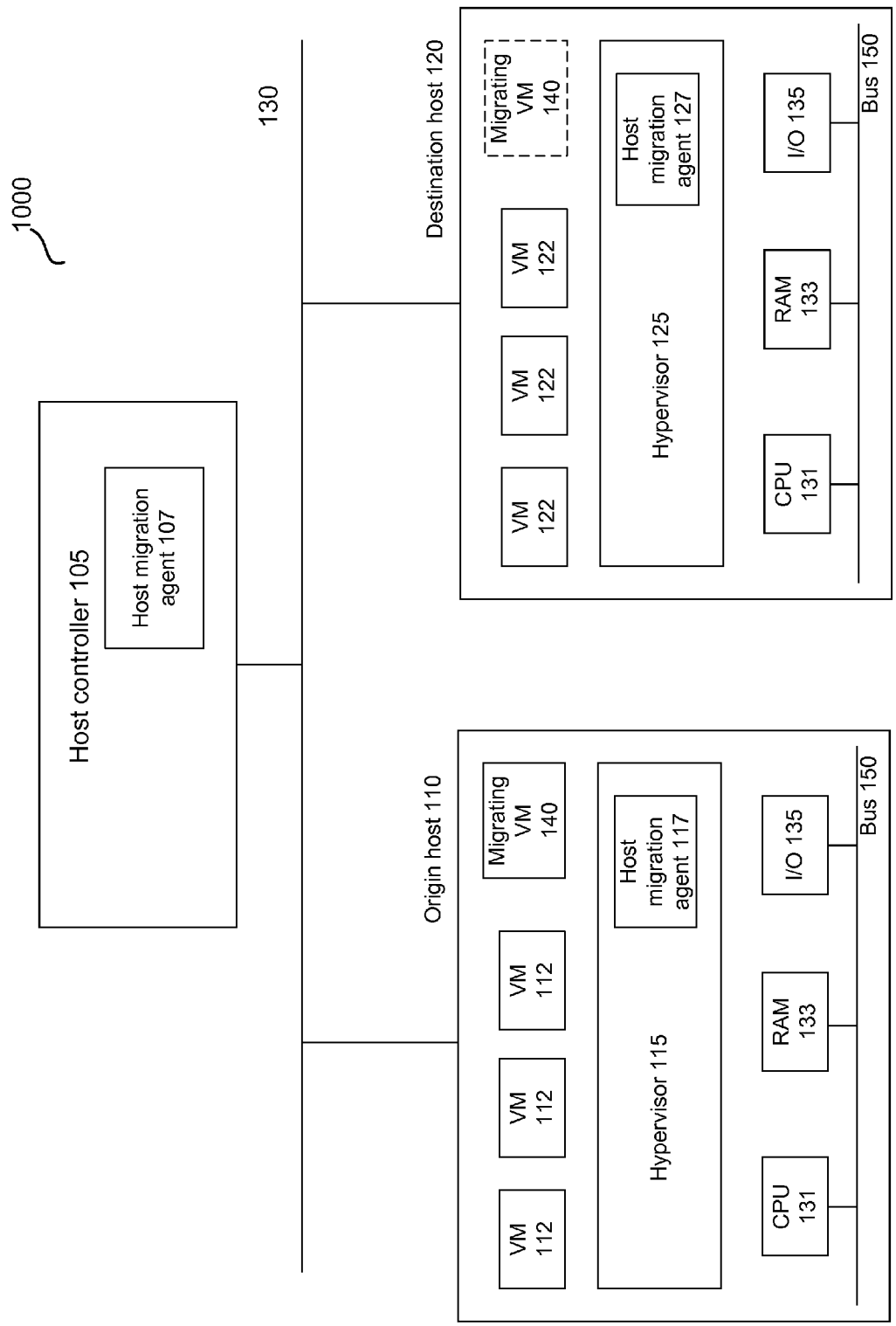
FIG. 1 depicts a high-level component diagram of an illustrative example computer system 1000 in accordance with one or more aspects of the present disclosure.

FIG. 1 depicts a high-level component diagram of one illustrative example of a computer system 1000 in accordance with one or more aspects of the present disclosure. The computer system 1000 may include computer systems 110 and 120 interconnected via a network 130. Each of the host computer systems 110 and 120 may include one or more processors 131 communicatively coupled to memory devices 133 and input/output (I/O) devices 135. Local connections within each of the hosts 110 and 120, including the connections between processors 131, memory 133, and I/O devices 135 may be provided by one or more local buses 150 of suitable architecture.

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Host computer systems 110 and 120 may run a plurality of virtual machines 112 and 122, by executing hypervisors 115 and 125, respectively. Each of hypervisors 115 and 125 may abstract the physical layer, including processors, memory, and I/O devices, and present this abstraction to virtual machines 112, 122 as virtual devices, including virtual processors, virtual memory, and virtual I/O devices.

Virtual machine 112, 122 may execute a guest operating system which may utilize the underlying virtual devices, including virtual processors, virtual memory, and virtual I/O devices. One or more applications may be running on virtual machine 112 under the guest operating system.

As schematically illustrated by FIG. 1, host computer systems 110 and 120 may be communicatively coupled to a host controller 105 which may reside on a designated computer system or on one of the hosts 110, 120. Host controller 105 may manage a plurality of virtual machines, including virtual machines 112 and 122. Host controller 105 may create a virtual machine, delete a virtual machine, and perform other virtual machine management functions. In certain implementations, host controller 105 may include a migration agent 107 which may manage live migration of virtual machines between host computer systems 110 and 120 in accordance with one or more aspects of the present disclosure. In certain implementations, host computer systems 110 and 120 may include host migration agents 117 and 127, respectively, designed to perform at least some of the virtual machine migration management functions in accordance with one or more aspects of the present disclosure.

For illustrative purposes, host computer system 110 may be referred to as the origin host from which virtual machine 140 may migrate to host computer system 120, which may accordingly be referred to as the destination host. Live migration may involve copying the virtual machine execution state from the origin host to the destination host. The virtual machine execution state may comprise the memory state, the virtual processor state, the virtual devices state, and/or the connectivity state.

In certain implementations, host migration agent 107, 117, and/or 127 may copy, over network 130, the execution state of the migrating virtual machine 140, including a plurality of memory pages, from origin host 110 to destination host 120 while virtual machine 140 is still running on origin host 110. Upon completing the virtual machine state copying operation, the migration agent may re-copy the memory pages which have been modified, or became "dirty," during the state copying operation. The migration agent may iteratively repeat the copying of dirty memory pages, until a pre-defined condition has been met, e.g., until the memory pages "dirtying" rate becomes less than or equal to the virtual machine state transfer rate. When the convergence condition is met, virtual machine 140 may be stopped at origin host 110, the dirty memory pages may be copied to destination host 120, and virtual machine 140 may be restarted at destination host 120.

As noted herein above, the migration agent may reduce the number of memory pages that need to be iteratively retransmitted, by observing the virtual machine behavior and transmitting the memory pages in a particular order. In an illustrative example, the migration agent may identify a plurality of stable memory pages (e.g., memory pages that have not been modified within a defined period of time) of the execution state of the virtual machine being migrated, and transmit the identified memory pages to the destination host computer system. The operations of identifying stable memory pages and transmitting them to the destination host may be repeated until the total size of the remaining memory pages falls below a specified threshold, at which stage the remaining ("unstable") memory pages may be transmitted to the destination host computer system in an arbitrary order. Upon transmitting the unstable memory pages, the virtual machine may be stopped at the origin host, and the dirty pages (i.e., the pages that have been modified since being transmitted to the destination host) may be identified and re-transmitted to the destination host.

To identify the stable memory pages, the origin host may enable memory access tracking and recurrently, at a defined memory tracking interval, identify a plurality of memory pages that have been modified within the last memory scanning cycle. When the total size of newly modified memory pages (i.e., memory pages that have been added to the plurality of modified memory pages during the current memory scanning cycle) falls below a pre-defined value, the remaining memory pages may be declared "stable." Stable memory pages are those that have not been modified within a defined time period, and hence may be assumed not to be modified for a comparable time period immediately following the time period of being stable. Thus, in order to decrease the ratio of memory pages that would need to be re-transmitted as having been modified after the previous transmission, the stable memory pages may be transmitted to the destination memory system before the memory pages that have recently been modified.

Example methods of virtual machine live migration in accordance with one or more aspects of the present disclosure are described herein below with references to flow diagrams of FIGS. 2 and 3.

Figure 2:
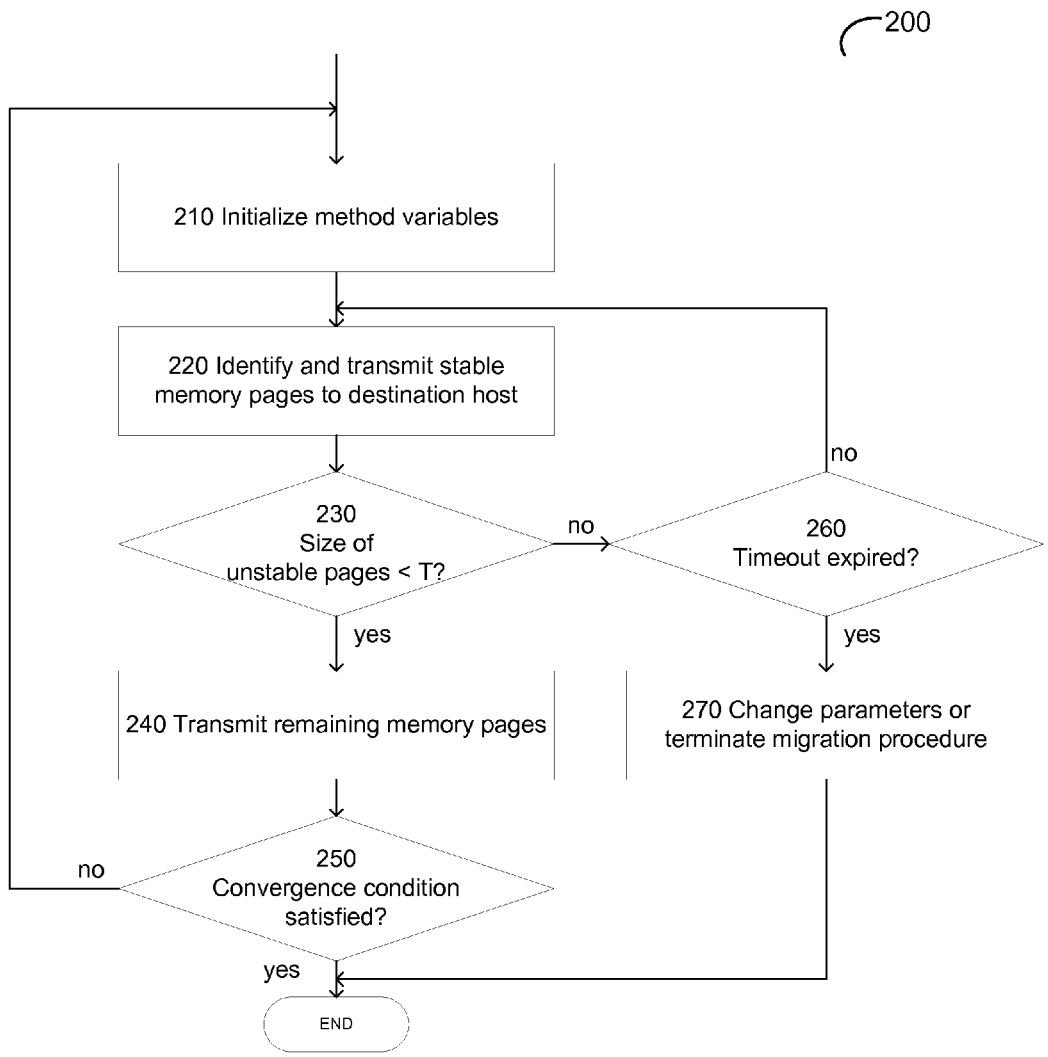
FIGS. 2-3 depict flow diagrams of example methods for virtual machine live migration, in accordance with one or more aspects of the present disclosure.

FIG. 2 depicts a flow diagram of an illustrative example of a method 200 for ordered transmission of memory pages during virtual machine live migration. Method 200 and/or each of its individual functions, routines, subroutines, or operations may be performed by one or more processors of the computer system (e.g., host computer system 110 of FIG. 1) executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, the host computer system may initialize various variables used by the method (e.g., the timeout to be used in determining whether the method should be terminated, as described herein below with references to block 260).

At block 220, the origin host computer system may identify stable memory pages, as described in more details herein below with references to FIG. 3. The identified stable memory pages may be transmitted to the destination host.

Responsive to ascertaining, at block 230, that the total size or number of the remaining memory pages does not exceed a pre-defined or dynamically calculated threshold value, the processing may continue at block 240. In an illustrative example, the threshold value may be chosen as a function of the total size of the virtual machine's memory and/or the virtual machine state transfer rate. The latter may be defined as the amount of data that may be transmitted, or have been actually transmitted, from the origin host to the destination host over the network in a unit of time. Responsive to determining, at block 230, that the total size or number of the remaining memory pages exceeds the threshold value, the method may branch to block 260.

Alternatively, at block 230 the method may determine that the rate of change of the remaining memory pages is below a threshold value, which may be chosen as a function of the total size of the virtual machine's memory and/or the virtual machine state transfer rate. Thus, responsive to determining, at block 230, that the rate of change of the remaining memory pages is below the threshold value, the method may branch to block 260.

Responsive to determining, at block 260, that a pre-defined timeout has not yet expired, the method may loop back to identifying a set of stable memory pages to be transmitted to the destination host.

At block 240, having determined that the total size or number of unstable memory pages has fallen below the pre-defined threshold value, the host computer system may transmit the unstable memory pages to the destination host.

The migration agent may iteratively repeat the memory page transmission operations referenced by blocks 210-240, until a pre-defined convergence condition has been met, e.g., until the memory pages "dirtying" rate becomes less than or equal to the virtual machine state transfer rate. Responsive to determining, at block 250, that the convergence condition has been met, the method may terminate. When the convergence condition is met, the virtual machine may be stopped at the origin host, the dirty memory pages (i.e., the pages that have been modified since being transmitted to the destination host) may be copied to the destination host, and the virtual machine may be restarted at the destination host.

Otherwise, responsive to determining, at block 250, that the convergence condition has not been met, the method may loop back to identifying a set of stable memory pages to be transmitted to the destination host, as described herein above with references to block 210. In certain implementations, the migration agent may declare the migration process failure should the virtual machine state fail to stabilize within a pre-defined time period. Alternatively, the migration agent may switch to a post-copy migration method, by stopping the virtual machine, transferring a subset of the virtual machine execution state (including the virtual processor state and non-pageable memory state) to the destination host, resuming the virtual machine at the destination host, generating a page fault responsive to detecting the virtual machine's attempt to access a memory page which has not yet been transferred, and transferring the page from the origin host to the destination host responsive to the page fault.

The timeout to be evaluated at block 260 is designed to prevent the method from going into an indefinite loop. Should the timeout expire while the total size or number of unstable memory pages has failed to fall below the pre-defined convergence threshold, the host computer system may remedy the situation by modifying one or more method parameters or switching to another migration method. In an illustrative example, the host computer system may increase the threshold size of unstable memory pages upon reaching which the method switches to transmitting the remaining unstable memory pages, as described with references to block 230. In another illustrative example, the host computer system may increase the timeout and loop back to identifying a set of stable memory pages to be transmitted to the destination host, as described herein above with references to block 220. Alternatively, responsive to determining, at block 260, that the timeout has expired, the host computer system may switch to a different migration procedure (e.g., to a procedure that involves transmitting the memory pages in a random or arbitrary selected order).

Figure 3:
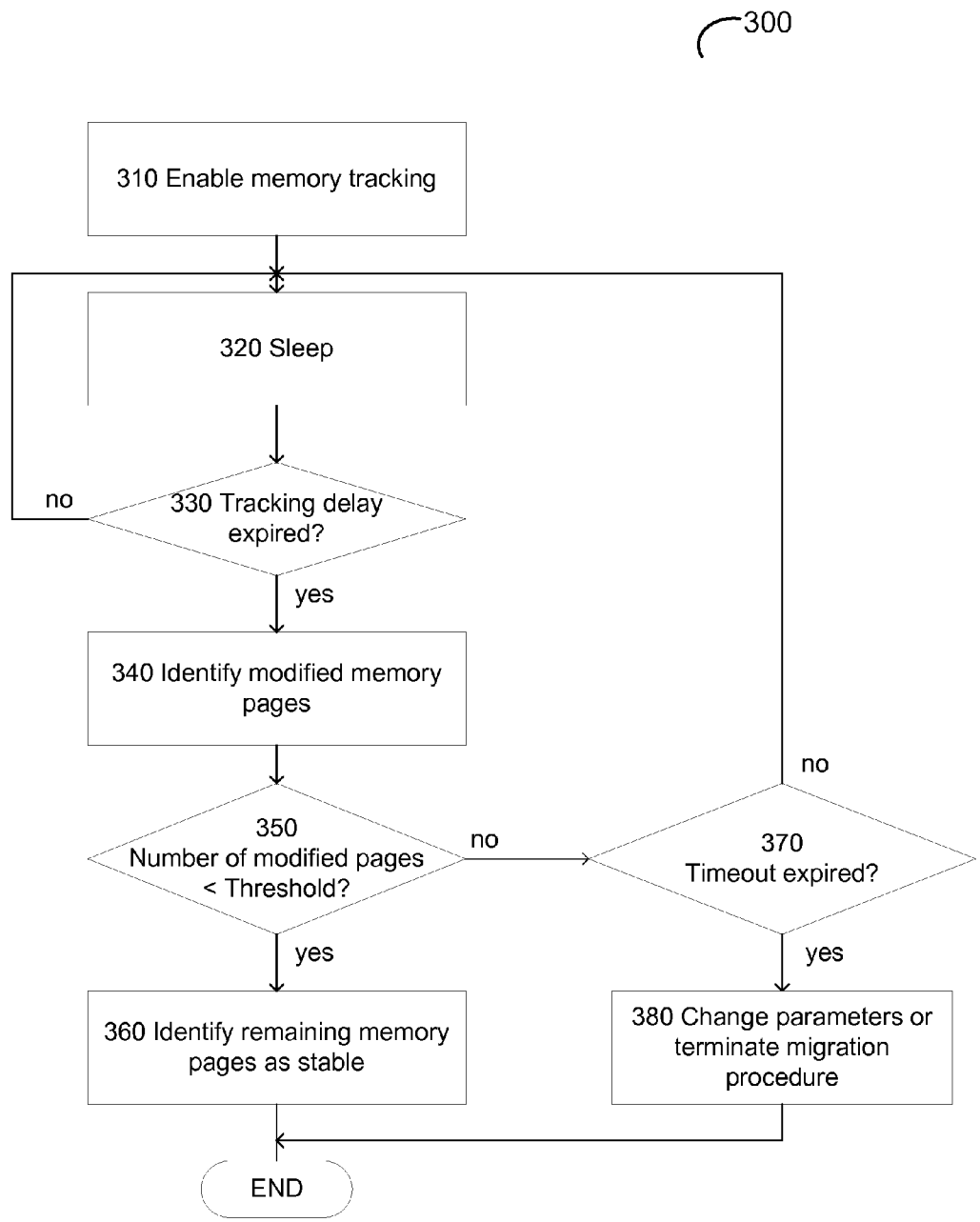

FIG. 3 depicts a flow diagram of an illustrative example of a method 300 for identifying stable memory pages belonging to memory address spaces of one or more virtual machines being migrated, in accordance with one or more aspect of the present disclosure. Method 300 and/or each of its individual functions, routines, subroutines, or operations may be performed by one or more processors of the computer system (e.g., host computer system 110 of FIG. 1) executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the origin host computer system may enable tracking of memory pages comprised by address spaces of one or more virtual machines being migrated to a destination host computer system.

At blocks 320-330, the host computer system may wait until a tracking delay is expired. The tracking delay value may be arbitrarily chosen or may be calculated as a function of one or more variables, including, e.g., virtual machine total memory size. In certain implementations, the value may be set to zero, thus introducing no delay between successive memory scanning cycles described herein below with references to blocks 350-360.

In an illustrative example, the processing thread which executes method 300 may transition into a sleeping state for the duration of the tracking delay, thus yielding the processor to other processing threads.

Responsive to determining, at block 330, that the tracking delay has expired, the host computer system may, at block 340, scan the virtual machine memory to identify a plurality of memory pages that has been modified since the last memory scanning iteration.

Responsive to determining, at block 350, that the total size or number of the modified memory pages is less than a threshold value, the host computer system may, at block 360, declare the remaining memory pages as "stable," and the method may terminate. In an illustrative example, the threshold value may be chosen as a function of the total size of the virtual machine's memory and/or the virtual machine state transfer rate.

Otherwise, if the total size or number of the modified memory pages exceeds the threshold value (i.e., the set of modified memory pages has at the last memory scanning iteration grown by more than the threshold value), the method may, at block 370, evaluate a pre-defined timeout. Responsive to ascertaining that the timeout has not yet expired, the method may loop back to the next memory scanning iteration referenced by blocks 320-340.

Before performing the next memory scanning iteration, the host computer system may optionally disable tracking of modified memory pages, thus optimizing the amount of memory to be tracked at the next iteration of the method. The host computer system may also optionally modify the tracking delay to be used in the next memory scanning iteration. In certain implementations, the tracking delay may be re-calculated based on the diminished size of the memory to be tracked. Alternatively, the tracking delay may be multiplied by a pre-defined or dynamically calculated positive factor being less than one. Upon re-calculating the tracking delay, the method may loop back to block 320.

The timeout to be evaluated at block 370 is designed to prevent the method from going into an indefinite loop. Responsive to ascertaining, at block 370 that the timeout has expired and the set of modified memory pages has failed to stabilized, the host computer system may modify one or more method parameters (e.g., the memory scanning timeout or the newly modified pages size threshold) or declare the method failure.

The set of stable memory pages returned by method 300 may be used in conjunction of method 200, as described herein above with references to FIG. 2. The combination of the above described methods 200 and 300 provides a heuristic-based method for efficient virtual machine live migration.

Figure 4:
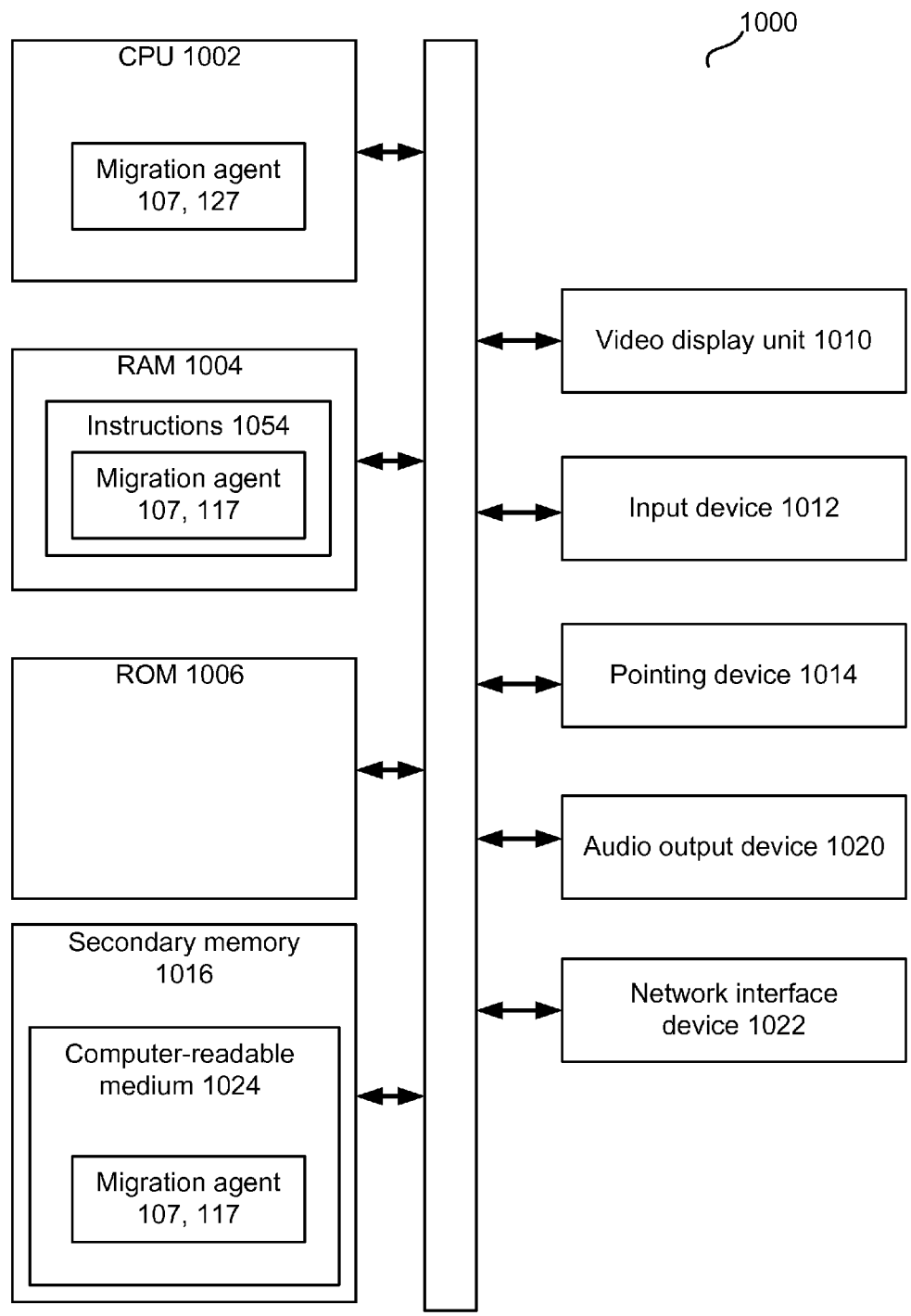
FIG. 4 depicts a block diagram of an illustrative computer system operating in accordance with the examples of the present disclosure.

FIG. 4 depicts an example computer system 1000 within which a set of instructions, for causing the computer system to perform any one or more of the methods described herein, may be executed. In certain implementations, computer system 1000 may correspond to the host computer system 110, 120 of FIG. 1.

In an illustrative example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may include a non-transitory computer-readable storage medium 1024 on which may be stored instructions of migration agent 107, 117 implementing the methods for virtual machine live migration described herein. Instructions of migration agent 107, 117 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative example as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method operations. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
   identifying, by a processing device, a plurality of stable memory pages associated with a virtual machine undergoing live migration from a first computer system to a second computer system, wherein the plurality of stable memory pages comprises memory pages that have not been modified within a defined period of time;

transmitting the plurality of stable memory pages to the second computer system;

determining, by the processing device, that an amount of memory comprised by a plurality of unstable memory pages is below a threshold value, wherein the plurality of unstable memory pages comprises memory pages that have been modified within the defined period of time; and transmitting the plurality of unstable memory pages to the second computer system.

2. The method of claim 1, further comprising:
responsive to determining that an amount of memory comprised by the plurality of unstable memory pages exceeds the threshold value, repeating the identifying and the transmitting operations.

3. The method of claim 1, further comprising:
determining that an amount of memory comprised by the plurality of unstable memory pages exceeds the threshold value;
responsive to determining that a defined timeout has expired since initiating a virtual machine migration procedure, performing one of: modifying a parameter of the virtual machine migration procedure or terminating the virtual machine migration procedure.

4. The method of claim 1, wherein identifying the plurality of stable memory pages comprises:
enabling memory tracking by the first computer system;
identifying modified memory pages; and
responsive to determining that a number of the modified memory pages is less than a defined threshold value, identifying remaining memory pages of the virtual machine as stable memory pages.

5. The method of claim 4, wherein identifying modified memory pages is performed responsive to expiration of a tracking delay.

6. The method of claim 4, further comprising:
responsive to determining that a number of the modified memory pages exceeds the defined threshold value, repeating the identifying modified memory pages operation.

7. The method of claim 4, further comprising:
responsive to determining that a number of the modified memory pages exceeds the defined threshold value, disabling tracking of the modified memory pages; and
repeating the identifying modified memory pages operation.

8. The method of claim 4, further comprising:
responsive to determining that a number of the modified memory pages exceeds the defined threshold value, updating the tracking delay; and
repeating the identifying modified memory pages operation.

9. The method of claim 1, wherein identifying the plurality of stable memory pages comprises:
enabling memory tracking by the first computer system;
responsive to expiration of a tracking delay, identifying modified memory pages; and
responsive to determining that a rate of change of the modified memory pages is less than a defined threshold value, identifying remaining memory pages of the virtual machine as stable memory pages.

10. A computer system, comprising:
a memory; and
a processing device, operatively coupled to the memory, to:
identify a plurality of stable memory pages associated with a virtual machine undergoing live migration to a second computer system, wherein the plurality of stable memory pages comprises memory pages that have not been modified within a defined period of time;
transmit the plurality of stable memory pages to the second computer system;
determine that an amount of memory comprised by a plurality of unstable memory pages is below a threshold value, wherein the plurality of unstable memory pages comprises memory pages that have been modified within the defined period of time; and
transmit the plurality of unstable memory pages to the second computer system.

11. The system of claim 10, wherein the processing device is further to:
responsive to determining that an amount of memory comprised by the plurality of unstable memory pages exceeds the threshold value, repeat the identifying and the transmitting operations.

12. The system of claim 10, wherein the processing device is further to:
determine that an amount of memory comprised by the plurality of unstable memory pages exceeds a threshold value;
responsive to determining that a defined timeout has expired since initiating a virtual machine migration procedure, perform one of: modifying a parameter of the virtual machine migration procedure or terminating the virtual machine migration procedure.

13. The system of claim 10, wherein to identify the plurality of stable memory pages, the processing device is further to:
enable memory tracking by the first computer system;
responsive to expiration of a tracking delay, identify modified memory pages; and
responsive to determining that a number of the modified memory pages is less than a defined threshold value, identify remaining memory pages of the virtual machine as stable memory pages.

14. The system of claim 13, wherein the processing device is further to:
responsive to determining that a number of the modified memory pages exceeds the defined threshold value, repeat the identifying modified memory pages operation.

15. The system of claim 13, wherein the processing device is further to:
responsive to determining that a number of the modified memory pages exceeds the defined threshold value, disable tracking of the modified memory pages; and
repeat the identifying modified memory pages operation.

16. A computer-readable non-transitory storage medium comprising executable instructions that, when executed by a processing device, cause the processing device to:
identify, by the processing device, a plurality of stable memory pages associated with a virtual machine undergoing live migration from a first computer system to a second computer system, wherein the plurality of stable memory pages comprises memory pages that have not been modified within a defined period of time;

transmit the plurality of stable memory pages to the second computer system;

determine, by the processing device, that an amount of memory comprised by a plurality of unstable memory pages is below a threshold value, wherein the plurality of unstable memory pages comprises memory pages that have been modified within the defined period of time; and transmit the plurality of unstable memory pages to the second computer system.

17. The computer-readable non-transitory storage medium of claim 16, further comprising executable instructions causing the processing device to:

responsive to determining that an amount of memory comprised by a plurality of unstable memory pages exceeds a threshold value, repeat the identifying and the transmitting operations.

18. The computer-readable non-transitory storage medium of claim 16, further comprising executable instructions causing the processing device to:

determine that an amount of memory comprised by the plurality of unstable memory pages exceeds a threshold value;

responsive to determining that a defined timeout has expired since initiating a virtual machine migration procedure, perform one of: modifying a parameter of the virtual machine migration procedure or terminating the virtual machine migration procedure.

19. The computer-readable non-transitory storage medium of claim 16, wherein executable instructions causing the processing device to identify the plurality of stable memory pages further comprise executable instructions causing the processing device to:

enable memory tracking by the first computer system;

responsive to expiration of a tracking delay, identify modified memory pages; and responsive to determining that a number of the modified memory pages is less than a defined threshold value, identify remaining memory pages of the virtual machine as stable memory pages.

20. The computer-readable non-transitory storage medium of claim 16, further comprising executable instructions causing the processing device to:

responsive to determining that a number of the modified memory pages exceeds the defined threshold value, repeat the identifying modified memory pages operation.

* * * * *